(12) United States Patent
Kim et al.

(10) Patent No.: US 12,679,753 B2
(45) Date of Patent: Jul. 14, 2026

(54) TREATMENT SYSTEM FOR SHIP BALLAST WATER

(71) Applicant: TECHWIN CO., LTD., Cheongju-si (KR)

(72) Inventors: Jung Sik Kim, Sejong-si (KR); Hyun Su Shin, Daejeon (KR); Tae Woo Kim, Cheongju-si (KR)

(73) Assignee: TECHWIN CO., LTD., Cheongju-si (KR)

( * ) Notice: Subject to any disclaimer, the term of this patent is extended or adjusted under 35 U.S.C. 154(b) by 346 days.

(21) Appl. No.: 18/491,445

(22) Filed: Oct. 20, 2023

(65) Prior Publication Data

US 2024/0043296 A1 Feb. 8, 2024

Related U.S. Application Data

(63) Continuation of application No. PCT/KR2022/004780, filed on Apr. 4, 2022.

(30) Foreign Application Priority Data

Jul. 23, 2021 (KR) ........................ 10-2021-0097036

(51) Int. Cl.
*C02F 1/50* (2023.01)
*C02F 103/00* (2006.01)
*C25B 1/14* (2006.01)

(52) U.S. Cl.
CPC .................. *C02F 1/50* (2013.01); *C25B 1/14* (2013.01); *C02F 2103/008* (2013.01); *C02F 2201/001* (2013.01); *C02F 2303/04* (2013.01)

(58) Field of Classification Search
CPC ...... C02F 2201/001; C02F 2201/46115; C02F 2201/46155
See application file for complete search history.

(56) References Cited

U.S. PATENT DOCUMENTS 4,229,277 A 10/1980 Specht
4,448,663 A * 5/1984 Dang ........................ C25B 9/19
204/283

FOREIGN PATENT DOCUMENTS

CN 105603455 A 5/2016
CN 110902775 A 3/2020
(Continued)

OTHER PUBLICATIONS

Gerhardt, Wolfgang et al—DE 19908964 A1—Nov. 11, 1999 (Year: 1999).*

(Continued)

*Primary Examiner* — Bradley R Spies
(74) *Attorney, Agent, or Firm* — Studebaker Brackett PLLC

(57) ABSTRACT

The present disclosure relates to a treatment system for ship ballast water, which comprises at least: a water supply device for supplying a water stream to a first tank storing solid raw material, and a first raw material supply device for mixing the solid raw material and the water stream to form a raw material aqueous solution; a first electrolysis unit that includes a first anode chamber for obtaining a first anode product by reacting the raw material aqueous solution, a first cathode chamber for obtaining a first cathode product by reacting water and cations provided from the first anode chamber, and a first diaphragm that separates the first anode chamber and the first cathode chamber; a reaction unit for obtaining a treatment agent by reacting the first anode product and the first cathode product; and an injection unit for providing the treatment agent to the ballast water.

18 Claims, 5 Drawing Sheets

(56)  References Cited

FOREIGN PATENT DOCUMENTS

| | | | |
|---|---|---|---|
| DE | 19908964 A1 * | 11/1999 | ............ C25B 15/08 |
| JP | S53-011199 A | 2/1978 | |
| JP | S59-501167 A | 7/1984 | |
| JP | S60-110889 A | 6/1985 | |
| JP | 2000-265289 A | 9/2000 | |
| JP | 2012152695 A * | 8/2012 | |
| KR | 10-1079470 B1 | 11/2011 | |
| KR | 10-1296213 B1 | 8/2013 | |
| KR | 10-2015-0056150 A | 5/2015 | |
| KR | 10-2016-0001786 A | 1/2016 | |
| KR | 10-2025559 B1 | 9/2019 | |
| WO | 2005/061394 A1 | 7/2005 | |
| WO | 2011/016781 A1 | 2/2011 | |
| WO | 2020/078553 A1 | 4/2020 | |

OTHER PUBLICATIONS

Ota, Yuichi—JP2012152695A machine translation—Aug. 16, 2012 (Year: 2012).*
International Search Report issued in PCT/KR2022/004780; mailed Jul. 6, 2022.

* cited by examiner

Ballast Water

Ballast Water

TREATMENT SYSTEM FOR SHIP BALLAST WATER

CROSS-REFERENCE TO RELATED APPLICATIONS

This application is a continuation of International Patent Application No. PCT/KR2022/004780, filed on Apr. 4, 2022, which claims priority to and the benefit of Korean Patent Application No. 10-2021-0097036, filed on Jul. 23, 2021, the disclosure of which is incorporated herein by reference in its entirety.

TECHNICAL FIELD

The present invention relates to a ballast water treatment system, and more particularly, to a ballast water treatment system that is installed inside a ship and can smoothly treat ballast water not only on an anchored vessel but also on a vessel in operation.

BACKGROUND ART

Sodium hypochlorite (NaOCl) is applied in various fields such as water and sewage, wastewater treatment, seawater electrolysis and ballast water treatment, sterilization and disinfection of agricultural products and food ingredients, and the like.

Recently, an on-site sodium hypochlorite production device suitable for small-scale water purification plants has been developed in consideration of stability, convenience of maintenance, and economic feasibility. Such an on-site sodium hypochlorite production device can produce sodium hypochlorite at a low concentration of 0.4 to 1.0% by electrolyzing salt water, but the on-site sodium hypochlorite production device has difficulty in removing by-products, has a low salt conversion rate and power efficiency, and has a limitation in its application to large-capacity facilities due to the low concentration of sodium hypochlorite.

A device and/or method for producing high-concentration sodium hypochlorite using a diaphragm method has been proposed. However, there is a problem in that, since there is no unit for purifying salt water (aqueous NaCl solution) supplied to an anode chamber, ionic impurities remaining in the salt water, such as calcium, magnesium, etc., contaminate an ion exchange membrane of an electrolysis tank so that power efficiency is reduced and the lifetime of the ion exchange membrane is shortened, and there is a problem in that it is difficult to adjust the material balance of the salt water supplied to the anode chamber using only a conductivity sensor and a temperature sensor.

Further, in the diaphragm type electrolysis tank, during an electrochemical reaction between salt (NaCl) and water, the consumption of salt is greater than the consumption of water, and thus the concentration of saturated salt water initially supplied to the anode chamber gradually decreases. In order to counter such a decrease in concentration, the saturated salt water may be injected to maintain the concentration thereof in a required range, but an overflow phenomenon may occur as the capacity of anode water increases. As the overflowed anode water is treated and recycled through a separate process, not only do the equipment, costs, and scale required for the separate process increase, but also human and material burdens increase due to the use of chemicals such as hydrochloric acid (HCl), sodium hydroxide (NaOH), a residual chlorine neutralizer, and the like.

A device for producing high-concentration sodium hypochlorite on site using seawater or artificial salt water has been proposed. However, when such a device is directly installed on a facility or vessel, the costs borne by the user of the facility or vessel may increase. In particular, when a treatment agent is produced by supplying seawater as a raw material to an electrolysis tank installed inside a vessel, there is a problem in that impurities in the seawater may cause a large amount of scale to form in equipment such as an electrolysis tank, it is difficult to easily control the concentration of the treatment agent, and the produced disinfectant decomposes rapidly so that the concentration cannot be maintained constant.

Further, since the concentrations and quality of seawater are different in sea areas where a vessel sails, there is a limitation in producing treatment agents of uniform quality from the seawater having different concentrations and quality. Since the concentration of a sodium hypochlorite solution is subject to restrictions not only by the nationality of the vessel, but also by the laws of the country in which the vessel is anchored or is in operation, international treaties, etc., there is a problem in that it is difficult to overcome these restrictions by producing sodium hypochlorite of various concentrations with conventional on-site devices, and treatment agents cannot be produced in freshwater areas due to the fundamental impossibility of supplying raw materials.

A technology in which seawater from which impurities or the like have been filtered out is mixed with an electrolyte and the mixture is used as a raw material for producing a treatment agent has been proposed. However, an expensive auxiliary device such as a filter or the like for filtering out impurities from seawater is required, and the auxiliary device causes an increase in the overall size of a treatment agent production device and becomes a factor that makes maintenance difficult. Further, there is a problem in that the concentration of the treatment agent produced using seawater as a raw material is limited to about 0.2 wt % or less, and such a low-concentration treatment agent is more likely to be arbitrarily changed or have its concentration lowered due to various components in the seawater compared to a high-concentration treatment agent, making it difficult to store the low-concentration treatment agent stably for a long period of time. Furthermore, there is a problem in that, when hypochlorous acid (HOCl) and sodium hydroxide (NaOH) are produced in an anode chamber and a cathode chamber of an electrolysis tank, respectively, and are used independently for the treatment of ballast water and the treatment of exhaust gas, it is difficult to control and store the production amount of each required material, and in particular, the produced HOCl has a low pH to generate chlorine gas ($Cl_2$), which is a highly corrosive toxic substance, which has a negative impact on the surrounding environment and the overall equipment.

DISCLOSURE

Technical Problem

The present invention is directed to solving the problems of the related art described above, and providing a ballast water treatment system that is installed inside a vessel, can smoothly treat ballast water not only on an anchored vessel but also on a vessel in operation, can improve maintainability, economic feasibility, efficiency, and the like by simplifying and miniaturizing the overall equipment, and can easily and smoothly respond to various variables and constraints, such as the nationality of the vessel, the laws of the country in which the vessel is anchored or is in operation, and international treaties.

Technical Solution

One aspect of the present invention provides a ballast water treatment system, which is installed inside a vessel, the treatment system including a first feed unit that includes a first tank in which a solid raw material is stored, a water supply device that supplies a first water stream to the first tank, and a first raw material supply device that mixes the solid raw material and the first water stream to generate an aqueous raw material solution, a first electrolysis unit that includes a first anode chamber in which a first anode product is obtained by reacting the aqueous raw material solution, a first cathode chamber in which a first cathode product is obtained by reacting water and cations provided from the first anode chamber, and a first diaphragm that separates the first anode chamber and the first cathode chamber, a reaction unit in which a treatment agent is obtained by reacting the first anode product and the first cathode product, and an injection unit that provides the treatment agent to ballast water.

In the first cathode chamber, the water may be at least a portion of the first water stream, which is a solvent of the aqueous raw material solution provided in the first anode chamber, provided from the first anode chamber to the first cathode chamber through the first diaphragm.

The first diaphragm may be a water-permeable porous membrane.

The first anode chamber may include two or more anode plates protruding at preset intervals, the first cathode chamber may include two or more cathode plates protruding at preset intervals in spaces between the anode plates, and the first diaphragm may be located in a space between the anode plate and the cathode plate.

In the first cathode chamber, the water may be at least a portion of a second water stream branching from the first water stream provided to the first cathode chamber.

The first diaphragm may be a cation exchange membrane.

The treatment system may further include a storage unit which is disposed between the reaction unit and the injection unit and in which the treatment agent is stored.

The treatment system may further include a heat exchange unit that cools the first electrolysis unit using the treatment agent stored in the storage unit.

A concentration of the treatment agent obtained in the reaction unit may range from 0.01 to 50 wt %.

The first feed unit may further include an aqueous raw material solution treatment device that removes impurities contained in the aqueous raw material solution.

The treatment system may further include a second feed unit that includes a second tank in which a metal salt containing two or more moles of metal ions in a molecule is stored, and a second raw material supply device that mixes the metal salt and a third water stream branching from the first water stream to provide an aqueous metal salt solution, a second electrolysis unit that includes a second anode chamber in which a second anode product is obtained by reacting the aqueous metal salt solution, a second cathode chamber in which a second cathode product is obtained by reacting a fourth water stream branching from at least one of the first to third water streams or provided from the second anode chamber, and metal ions provided from the second anode chamber, and a second diaphragm that separates the second anode chamber and the second cathode chamber, and a connection unit that combines the second cathode product and the first cathode product and provides a result of the combination to the reaction unit.

The second tank, a pipe through which the aqueous metal salt solution is supplied to the second anode chamber, the second anode chamber, and a pipe through which the second anode product is supplied to the second tank may constitute a closed loop.

The closed loop may include an exhaust port for discharging a gas contained in a substance circulating along the closed loop.

The metal salt may have a structure according to the following Formula.

$$M_xA_y \qquad \text{<Formula>}$$

In Formula above, M denotes a monovalent or divalent metal ion, x denotes an integer greater than or equal to 2, A denotes a negative ionic substance that can be combined with the metal ion M, and y denotes an integers that satisfies the above Formula.

The second diaphragm may be a water-permeable porous membrane.

The second diaphragm may be a cation exchange membrane.

The first and second electrolysis units may be connected in parallel.

The treatment system may further include a hydrogen gas treatment unit.

Advantageous Effects

A ballast water treatment system according to an aspect of the present invention is installed inside a vessel, and includes a first feed unit that includes a first tank in which a solid raw material is stored, a water supply device that supplies a first water stream to the first tank, and a first raw material supply device that mixes the solid raw material and the first water stream to generate an aqueous raw material solution, a first electrolysis unit that includes a first anode chamber in which a first anode product is obtained by reacting the aqueous raw material solution, a first cathode chamber in which a first cathode product is obtained by reacting water and cations provided from the first anode chamber, and a first diaphragm that separates the first anode chamber and the first cathode chamber, a reaction unit in which a treatment agent is obtained by reacting the first anode product and the first cathode product, and an injection unit that provides the treatment agent to ballast water. Therefore, it is possible to smoothly treat ballast water not only on an anchored vessel but also on a vessel in operation, it is possible to improve maintainability, economic feasibility, efficiency, and the like by simplifying and miniaturizing the overall equipment, and it is possible to easily and smoothly respond to various variables and constraints, such as the nationality of the vessel, the laws of the country in which the vessel is anchored or is in operation, and international treaties.

Effects of the present invention are not limited to the above described effects, and it should be understood that all possible effects deduced from a configuration of the present invention described in detailed descriptions and the claims are included.

MODES OF THE INVENTION

Figure 1:
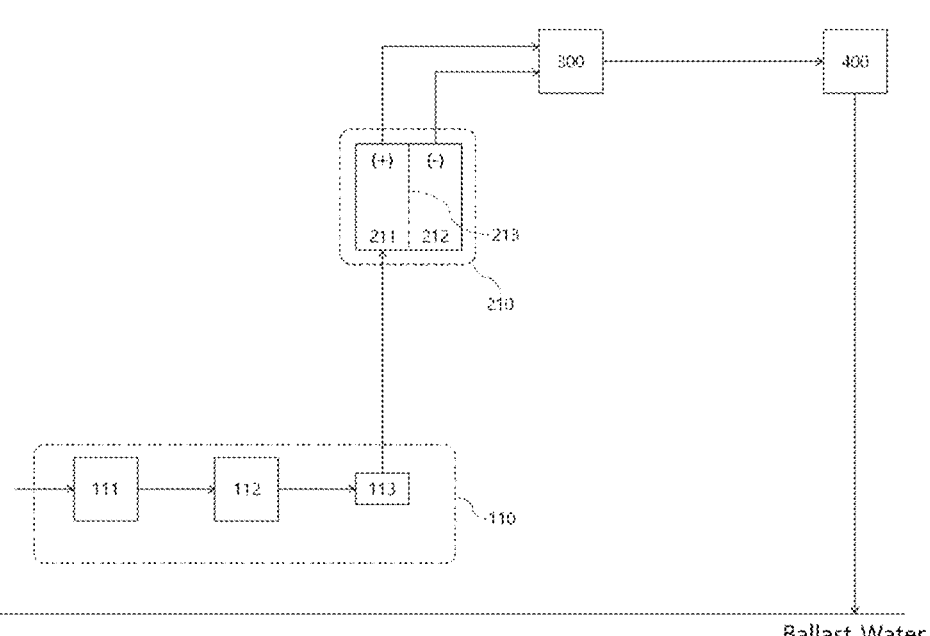
FIG. 1 illustrates a ballast water treatment system according to an embodiment of the present invention.

Hereinafter, the present invention will be described with reference to the accompanying drawings. However, embodiments of the present invention may be implemented in several different forms and are not limited to embodiments described herein. In addition, parts irrelevant to description are omitted in the drawings in order to clearly describe the present invention. Similar parts are denoted by similar reference numerals throughout this specification.

In addition, throughout this specification, when a part is described as being "connected" to another part, this includes not only cases where it is "directly connected" but also cases where it is "indirectly connected" via an intervening part. Also, when a certain part "includes" a certain component, this does not mean that other components are excluded from being included unless described otherwise, and other components may in fact be included.

Hereinafter, embodiments of the present invention will be described in detail with reference to the accompanying drawings.

FIG. 1 illustrates a ballast water treatment system according to an embodiment of the present invention.

Referring to FIG. 1, the ballast water treatment system according to the embodiment of the present invention, which is installed inside a vessel, may include a first feed unit 110 that includes a first tank 112 in which a solid raw material is stored, a water supply device 111 that supplies a first water stream to the first tank 112, and a first raw material supply device 113 that mixes the solid raw material and the first water stream to generate an aqueous raw material solution, a first electrolysis unit 210 that includes a first anode chamber 211 in which a first anode product is obtained by reacting the aqueous raw material solution, a first cathode chamber 212 in which a first cathode product is obtained by reacting water and cations provided from the first anode chamber 211, and a first diaphragm 213 that separates the first anode chamber 211 and the first cathode chamber 212, a reaction unit 300 in which a treatment agent is obtained by reacting the first anode product and the first cathode product, and an injection unit 400 that provides the treatment agent to ballast water.

Conventionally, a technology has been proposed in which a treatment agent produced outside a vessel, for example, sodium hypochlorite, is directly provided to ballast water or is stored in a tank installed inside the vessel, and provided to the ballast water as necessary. However, there is a problem in that the former can be applied only when the vessel is anchored at a specific point at which treatment agent production and/or injection facilities are installed or a separate vessel or facility for providing a treatment agent to the vessel in operation is docked, and the latter cannot treat the ballast water after the stored treatment agent on the vessel in operation has been exhausted.

Further, conventionally, a technology has been proposed in which seawater from which impurities or the like have been filtered out is mixed with an electrolyte and the mixture is used as a raw material for producing a treatment agent. However, an expensive auxiliary device such as a filter or the like for filtering out impurities from seawater is required, and the auxiliary device causes an increase in the overall size of a treatment agent production device and becomes a factor that makes maintenance difficult. Further, there is a problem in that the concentration of the treatment agent produced using seawater as a raw material is limited to about 0.2 wt % or less, and such a low-concentration treatment agent is more likely to be arbitrarily changed than a high-concentration treatment agent, making it difficult to store the low-concentration treatment agent stably for a long period of time. Further, there is a problem in that when using such a low-concentration treatment agent, in order to increase the death rate of marine life, a filter should be used, but this is disadvantageous in terms of economic feasibility because the proportion of the cost spent on the filter among the total equipment is large. On the other hand, there is a problem in that a diaphragm type electrolysis facility is required to produce a high-concentration treatment agent, but seawater cannot be used as it is, and complex equipment and excessive costs are required to pre-treat the seawater.

In this regard, since the ballast water treatment system is installed inside the vessel, the ballast water treatment system can smoothly treat ballast water not only on an anchored vessel but also on a vessel in operation, and since the ballast water treatment system can treat the ballast water by continuously preparing, producing, and storing a high-concentration treatment agent using a solid raw material stored inside the vessel as necessary, auxiliary equipment such as a filter or the like is not required.

The first feed unit 110 may include the first tank 112 in which a solid raw material, for example, salt, is stored, the water supply device 111 that provides a first water stream to the first tank 112, and the first raw material supply device 113 that mixes the solid raw material and the first water stream to generate an aqueous raw material solution.

In the first tank 112, the solid raw material supplied from the outside, for example, salt, may be stored, and the first raw material supply device 113 may mix the solid raw material and the first water stream consisting of tap water, purified water (pure or higher), and/or seawater from which impurities have been filtered out, provided from the water supply device 111, generate an aqueous raw material solution of a preset concentration, preferably, salt water, and more preferably, saturated salt water, and provide the generated aqueous raw material solution to the first anode chamber 211 of the first electrolysis unit 210.

The first water stream provided from the water supply device 111 may consist of tap water, purified water (pure or higher), and/or seawater from which impurities have been filtered out. The tap water, the purified water (pure or higher), and/or the seawater from which the impurities have been filtered out are treated (filtered, sterilized, etc.) in separate facilities located outside the vessel, may be stored in a water tank (not illustrated) provided at the front of the water supply device 111, and may be provided to the first tank 112 by the water supply device 111 as necessary.

Since the water supply device 111 may not include any device for introducing seawater into the vessel and filtering and purifying the seawater, for example, an expensive auxiliary device such as a filter, and may directly provide pre-stored tap water, purified water (pure or higher), and/or seawater from which impurities have been filtered out to the first tank 112, the overall ballast water treatment system may be simplified and miniaturized, and thus maintainability, economic feasibility, efficiency, and the like may be improved.

The first raw material supply device 113 may mix the first water stream consisting of the pre-stored tap water, purified water (pure or higher), and/or seawater from which the impurities have been filtered out and the solid raw material stored in the first tank 112 at a preset ratio to generate an aqueous raw material solution.

The aqueous raw material solution generated and provided by the first raw material supply device 113 contains an electrolyte and water, which are raw materials for the treatment agent, but does not substantially contain impurities by being treated by an aqueous raw material solution treatment device (not illustrated) as necessary, and thus it is possible to effectively prevent unnecessary scale and the like generated in the ballast water treatment system due to the impurities, and it is possible to easily and precisely control the concentration of the aqueous treatment agent solution obtained through the first electrolysis unit 210 by adjusting the amount of aqueous raw material solution or an applied current.

The first raw material supply device 113 may include an aqueous raw material solution treatment device (not illustrated). The aqueous raw material solution treatment device may remove residual impurities, such as calcium, magnesium, and the like, contained in the aqueous raw material solution generated in the first raw material supply device 113, for example, saturated salt water, and thus it is possible to prevent contamination of the first diaphragm 213 of the first electrolysis unit 210 to increase the efficiency of the electrolysis reaction, and it is possible to contribute to increasing the durability and lifetime of the first diaphragm 213.

Further, the aqueous raw material solution treatment device may include a heating unit in which a heater is provided in a water tank of a preset standard, a pH control unit, and a water softening device (not illustrated) in which a chelating resin that can adsorb and remove impurities in the aqueous raw material solution that has passed through the heating unit is provided. The heating unit may appropriately maintain the temperature and pH of the unpurified aqueous raw material solution, for example, saturated salt water, and thus the adsorption efficiency of the water softening device may be improved. For example, the appropriate temperature of the saturated salt water may range from 50 to 80° C., and the pH may be 9 or more, but the present invention is not limited thereto.

The first electrolysis unit 210 may include the first anode chamber 211 in which a first anode product is obtained by reacting the aqueous raw material solution, the first cathode chamber 212 in which a first cathode product is obtained by reacting water and cations, preferably, metal ions, provided from the first anode chamber 211, and the first diaphragm 213 that separates the first anode chamber 211 and the first cathode chamber 212.

The first anode chamber 211 may include a anode, and may support a first anode product including anode water generated by an electrolysis reaction at the anode and a gaseous substance. Further, the first cathode chamber 212 may include a cathode, and may support a first cathode product including cathode water generated by an electrolysis reaction at the cathode and a gaseous substance.

In the case in which the aqueous raw material solution is salt water, and preferably, saturated salt water, when a preset voltage is applied to the first electrolysis unit 210, the following substances may be generated in the first anode chamber 211 and the first cathode chamber 212.

In the first anode chamber 211, saturated salt water having a preset concentration may be electrolyzed and sodium ions $(Na^+)$, chlorine gas $(Cl_2)$, and chlorine ions $(Cl^-)$ may be generated, and in the first cathode chamber 212, the water may be electrolyzed and hydrogen gas $(H_2)$ and hydroxide ions $(OH^-)$ may be generated. The sodium ions generated in the first anode chamber 211 may move to the first cathode chamber 212 through the first diaphragm 213, and react with the hydroxide ions pre-generated in the first cathode chamber 212 to generate sodium hydroxide.

The sodium hydroxide generated in the first cathode chamber 212 may be used alone and/or together with a metal hydroxide obtained in a second cathode chamber 222 of a metal hydroxide generation unit to be described below, as a raw material for producing a treatment agent and/or as a buffer for increasing storage stability by adjusting the pH of the produced treatment agent.

Figure 2A:
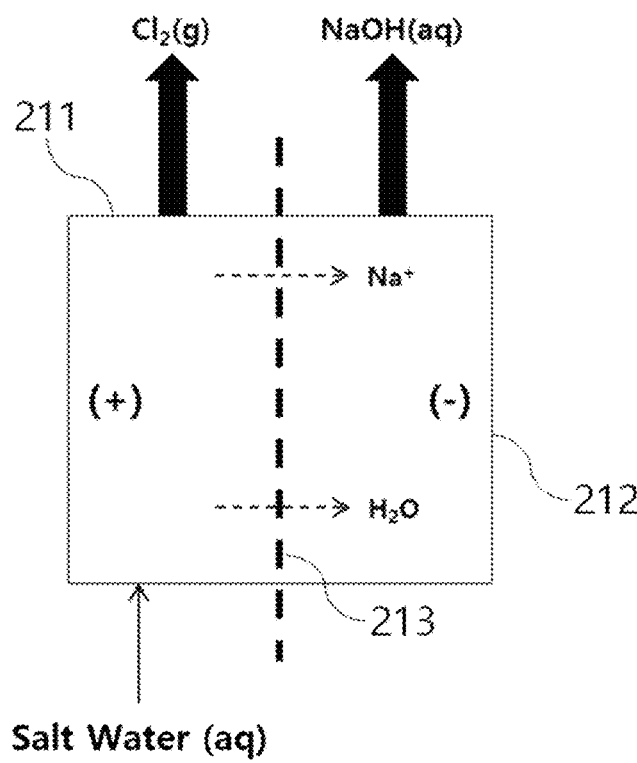
FIGS. 2A and 2B illustrates a first electrolysis unit according to an embodiment of the present invention.
Figure 2B:
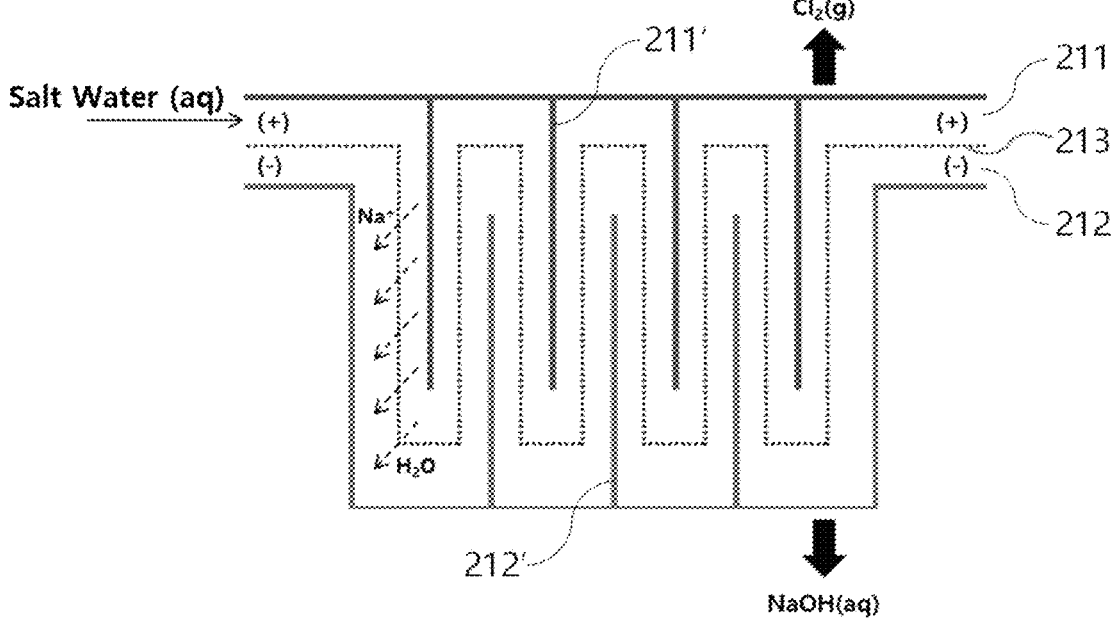

FIGS. 2A and 2B illustrates the first electrolysis unit 210 according to the embodiment of the present invention.

Referring to FIG. 2A, in the first cathode chamber 212, the water may be at least a portion of the first water stream, which is a solvent of the aqueous raw material solution provided in the first anode chamber 211, provided from the first anode chamber 211 to the first cathode chamber 212 through the first diaphragm 213.

In this case, the water supply device 111 in the feed unit provides the first water stream only to the first tank 112, and the aqueous raw material solution generated by the first raw material supply device 113 is provided to the first anode chamber 211. Cations, preferably, metal ions, required to generate the metal hydroxide in the first cathode chamber 212 may be provided from the first anode chamber 211 to the first cathode chamber 212 through the first diaphragm 213 chemically and/or physically, and hydroxide ions may be generated by an electrolysis reaction of the water provided from the first anode chamber 211 to the first cathode chamber 212 through the first diaphragm 213 chemically and/or physically. As used herein, the term "chemical permeation" means that an ionic substance with predetermined charges passes through a diaphragm through a chemical operation such as an ion exchange reaction, and the term "physical permeation" means that a substance passes through a diaphragm by overcoming the physical and structural elements of the diaphragm, such as the size of pores provided in the diaphragm and the thickness of the diaphragm.

As described above, substantially all the cations and the water, which are raw materials required to generate the metal hydroxide in the first cathode chamber 212, may move from the first anode chamber 211 to the first cathode chamber 212 through the first diaphragm 213.

Referring to FIG. 1 again, since the feed unit and the first electrolysis unit 210 may be connected only by a pipe for connecting the feed unit and the first anode chamber 211 and providing an aqueous raw material solution of a preset concentration to the first anode chamber 211, and separate parts such as a pipe and the like for supplying water, which is a raw material for hydroxide ions, from the water supply device 111 to the first cathode chamber 212, may be omitted, the overall ballast water treatment system may be simplified and miniaturized, and thus maintainability, economic feasibility, efficiency, and the like may be improved.

The first diaphragm 213 may be a water-permeable porous membrane.

Generally, a water-permeable porous membrane made of a ceramic material such as asbestos may include a plurality of through-holes and/or pores, which are paths through which water passes and moves. However, since the water-permeable porous membrane does not have the ion exchange ability to selectively allow specific ions to pass through, negative ions such as chlorine ions generated in the first anode chamber 211 may move to the first cathode chamber 212 together with the water and the cations, and act as by-products that inhibit an electrolysis reaction in the first cathode chamber 212.

Further, the passage and movement of water through the through-holes and/or pores may occur in both directions rather than in only one direction, and accordingly, when the water and cations provided to the first cathode chamber 212 and the hydroxide ions generated in the first cathode chamber 212 flow back into the first anode chamber 211, since raw materials cannot be stably provided to the first cathode chamber 212, there is a problem in that metal hydroxides and a treatment agents, for example, sodium hydroxide and sodium hypochlorite, cannot be smoothly produced.

Meanwhile, a soft cation exchange membrane made of a polymer film may allow the cations generated in the first anode chamber 211 to pass through and move to the first cathode chamber 212 by an ion exchange reaction with a functional group provided in the cation exchange membrane, and in some cases, water molecules may form hydrates with cations and may pass through and move to the first cathode chamber 212 through the cation exchange membrane. However, since the size of the pores provided in the membrane is very small, i.e., nanometers (nm), liquid substances, for example, water, cannot move smoothly from the first anode chamber 211 to the first cathode chamber 212, and thus separate parts such as a pipe and the like are required to provide sufficient water to the first cathode chamber 212.

In this regard, since the first diaphragm 213 is provided as a water-permeable porous membrane, the first diaphragm 213 may allow a sufficient amount of water to pass from the first anode chamber 211 to the first cathode chamber 212.

Further, the ion exchange ability may be imparted to the water-permeable porous membrane by chemically and/or physically treating the surface of the water-permeable porous membrane and/or the surface of the pores provided therein. The water-permeable porous membrane having ion exchange ability may selectively allow the cations generated in the first anode chamber 211 to pass therethrough to the first cathode chamber 212 due to the inherent electrochemical properties of the membrane.

However, even when the first diaphragm 213 is a water-permeable porous membrane, the water and cations provided to the first cathode chamber 212 due to the structural factors of the first electrolysis unit 210 such as the relative positions of the first anode chamber 211 and the first cathode chamber 212 separated by the first diaphragm 213, and the hydroxide ions generated in the first cathode chamber 212 may flow back into the first anode chamber 211, and accordingly, since raw materials cannot be stably provided to the first cathode chamber 212, there is a problem in that metal hydroxides and treatment agents, for example, sodium hydroxide and sodium hypochlorite, cannot be smoothly produced.

Referring to FIG. 2B, the first anode chamber 211 may include two or more anode plates 211' protruding downward at preset intervals, the first cathode chamber 212 may include two or more cathode plates 212' protruding upward at preset intervals in spaces between the anode plates 211', and the first diaphragm 213 may be located in a space between the anode plate 211' and the cathode plate 212'. Further, the first diaphragm 213 may separate the first anode chamber 211 and the first cathode chamber 212 so that the first anode chamber 211 and the first cathode chamber 212 are located at upper and lower portions of the first electrolysis unit 210, respectively.

The anode plate 211' and the cathode plate 212' may be respectively located in the spaces between two adjacent cathode plates 212' and between two adjacent anode plates 211', and the anode plate 211' and the cathode plate 212' may be spaced apart from each other at a preset interval and may not be in contact with each other. That is, the anode plates 211' and the cathode plates 212' may form a non-contact crossed comb-tooth structure. The crossed comb-tooth structure consisting of the anode plates 211' and the cathode plates 212' may contribute to improving reaction efficiency and productivity by increasing the area of the electrode where an electrolysis reaction is performed.

The first diaphragm 213 may be located in the space between the anode plates 211' and the cathode plates 212' to separate the first anode chamber 211 and the first cathode chamber 212 so that the first anode chamber 211 and the first cathode chamber 212 are located at the upper and lower portions of the first electrolysis unit 210, respectively. The substances within the first electrolysis unit 210 preferably move from the first anode chamber 211 to the first cathode chamber 212, and it is necessary to appropriately suppress a backflow phenomenon in which the substances move from the first cathode chamber 212 to the first anode chamber 211.

Since the first diaphragm 213 separates the first anode chamber 211 and the first cathode chamber 212 so that the first anode chamber 211 and the first cathode chamber 212 are located at the upper and lower portions of the first electrolysis unit 210, respectively, the first diaphragm 213 may physically force a direction of movement of the substances within the first electrolysis unit 210 to be a direction from the first anode chamber 211 to the first cathode chamber 212. Specifically, in the case in which the aqueous raw material solution is salt water, when a voltage is applied to the first electrolysis unit 210, sodium ions ($Na^+$), chlorine gas ($Cl_2$), and chlorine ions ($Cl^-$) may be generated in the first anode chamber 211, and hydrogen gas ($H_2$) and hydroxide ions ($OH^-$) which are generated by electrolysis of water, and sodium hydroxide, which are generated by a reaction of the sodium ions and the hydroxide ions provided from the first anode chamber 211, may be generated in the first cathode chamber 212.

In this way, in order to stably maintain the structure of the first electrolysis unit 210 in which the first anode chamber 211 and the second cathode chamber 222 are separated, for example, the first anode chamber 211 and the second cathode chamber 222 are separated to be located at upper and lower portions, respectively, the first diaphragm 213, that is, the water-permeable porous membrane, may include a hard material. For example, the first diaphragm 213 may be made of an organic material such as a polymer, an inorganic material such as a metal, a ceramic, or a combination thereof.

Due to a density difference, in the first anode chamber 211, chlorine gas may move to the upper portion of the first anode chamber 211, and sodium ions may move to the lower portion of the first anode chamber 211, pass through the first diaphragm 213, and move to the first cathode chamber 212 in a dissolved state in water. Further, in the first cathode chamber 212, sodium hydroxide may move to the lower portion of the first cathode chamber 212 in an aqueous solution state. Accordingly, chlorine gas and an aqueous sodium hydroxide solution, which are reactants for producing sodium hypochlorite, may be obtained in the upper portion of the first anode chamber 211 and the lower portion of the first cathode chamber 212, respectively.

Figure 3:
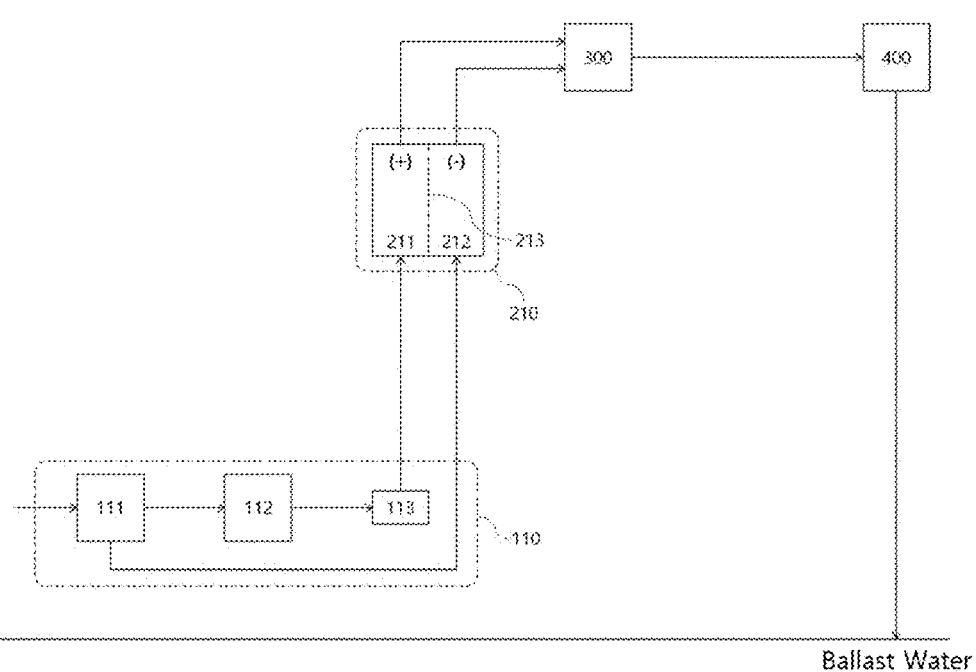
FIGS. 3 to 6 illustrate ballast water treatment systems according to other embodiments of the present invention.

FIG. 3 illustrates a ballast water treatment system according to another embodiment of the present invention.

Referring to FIG. 3, in the first cathode chamber 212, the water may be at least a portion of a second water stream branching from the first water stream provided to the first cathode chamber 212. In some cases, the amount of water provided from the first anode chamber 211 to the first cathode chamber 212 due to physical and structural factors may be insufficient to drive the first electrolysis unit to produce the required amount of treatment agent.

In this regard, the ballast water treatment system further includes separate parts, such as a pipe and the like for providing the second water stream, which is a raw material for hydroxide ions, from the water supply device 111 of the first feed unit 110 to the first cathode chamber 212 to supplement the amount of water provided to the first cathode chamber 212.

The first diaphragm 213 may be a cation exchange membrane. The cation exchange membrane may be a soft cation exchange membrane made of a polymer film. The cation exchange membrane may allow the cations generated in the first anode chamber 211, for example, sodium ions, to pass through and move to the first cathode chamber 212 by an ion exchange reaction with a functional group provided in the cation exchange membrane. However, since the size of the pores provided in the membrane is very small, i.e., nanometers (nm), the cation exchange membrane may prevent liquid substances, for example, water, from smoothly moving from the first anode chamber 211 to the first cathode chamber 212.

Further, the cation exchange membrane may include an additional layer and/or functional group that can prevent the hydroxide ions generated in the first cathode chamber 212 from passing through and moving to the first anode chamber 211.

The reaction unit 300 may react the first anode product, for example, chlorine gas, generated in the first anode chamber 211 of the first electrolysis unit 210 with the first cathode product, for example, sodium hydroxide, generated in the first cathode chamber 212 to generate a treatment agent, for example, sodium hypochlorite. The reaction unit 300 may be an independent device or independent equipment connected to the first electrolysis unit 210 at the front end and the injection unit 400 at the rear end through a pipe or the like, and although not illustrated, the reaction unit 300 may be integrated with the first electrolysis unit 210 at the front without a separate pipe.

In the latter case, a portion of the inside of the first electrolysis unit 210 may be provided as a space in which the first anode product and the first cathode product are collected, and the first anode product and the first cathode product may react in the space to generate a treatment agent. Further, when the reaction unit 300 and the first electrolysis unit 210 are provided integrally, since a device or equipment for respectively circulating at least some of anode products and/or cathode products that are essentially provided in the conventional diaphragm electrolysis unit to the anode chamber and/or the cathode chamber may be omitted, the overall ballast water treatment system may be simplified and miniaturized, and thus maintainability, economic feasibility, efficiency, and the like may be improved.

The concentration of the treatment agent obtained in the reaction unit 300, specifically, the concentration of an aqueous sodium hypochlorite solution, may range from 0.01 to 50 wt %, preferably, 0.1 to 20 wt %, and more preferably, 0.2 to 15 wt %.

Figure 4:
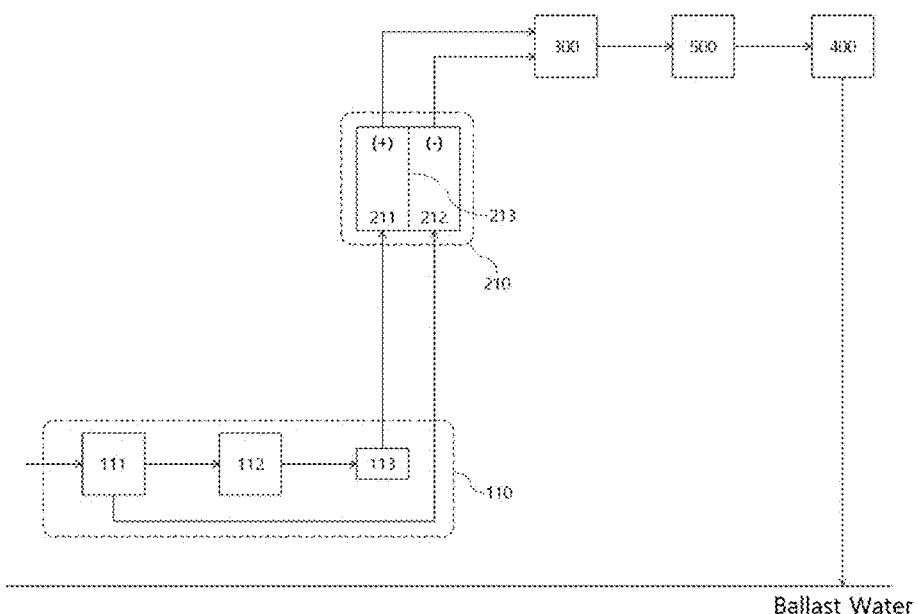
Figure 5:
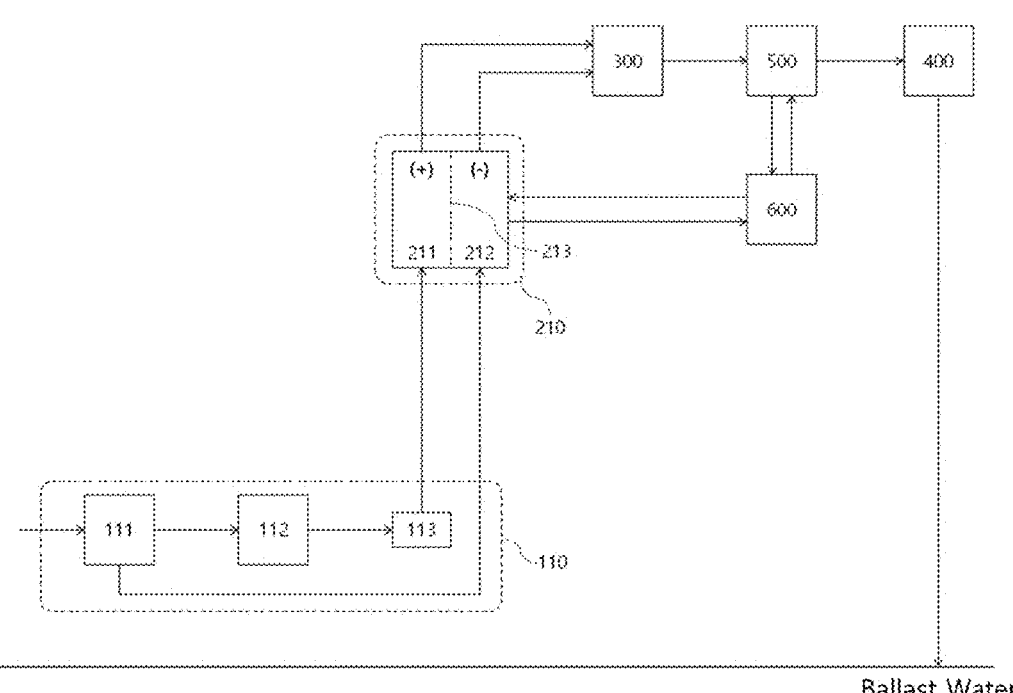

FIGS. 4 and 5 illustrate ballast water treatment systems according to other embodiments of the present invention.

Referring to FIG. 4, the ballast water treatment system may further include a storage unit 500 which is disposed between the reaction unit 300 and the injection unit 400 and in which the treatment agent generated in the reaction unit 300 is stored.

When the amount of treatment agent generated in the first electrolysis unit 210 exceeds the amount of treatment agent required to treat ballast water, the overproduced treatment agent may be stably stored in the storage unit 500, and when the amount of treatment agent generated in the first electrolysis unit 210 is insufficient, when the first electrolysis unit 210 is broken, or when the operation of the first electrolysis unit 210 is stopped for maintenance, the storage unit 500 may provide the stored treatment agent to the ballast water through the injection unit 400, thereby enabling the ballast water to be continuously and smoothly treated while the vessel is in operation or anchored. Further, when the operation of the first electrolysis unit 210 is stopped for a long period of time, a treatment agent produced outside the vessel may be injected and stored in the storage unit 500, and may be used to treat the ballast water as necessary.

The storage unit 500 may be a sealed device or sealed equipment in which one selected from the group consisting of temperature, humidity, pressure, concentration of treatment agent, and a combination of two or more thereof is controlled. For example, the storage unit 500 may further include a temperature sensor, a temperature control device, a pressure sensor, a pressure control device, a humidity sensor, a humidity control device, a concentration sensor, a concentration control device, an external air blocking device, and a leak prevention device that ensure the stability of the treatment agent, an exhaust device that discharges gas generated during storage, etc. The leak prevention device may include, for example, a leak detector, a discharge barrier, a catalytic reactor and/or neutralizer for detoxifying leaked treatment agents, a device for preventing diffusion through absorption and/or adsorption, etc., but the present invention is not limited thereto.

The storage unit 500 may be integrated with the injection unit 400, and the storage unit 500 may further include a device or equipment that can check and control an injection amount and state of the treatment agent.

Referring to FIG. 5, the ballast water treatment system may further include a heat exchange unit 600 that cools the first electrolysis unit 210 using the treatment agent stored in the storage unit 500.

The heat exchange unit 600 may include a cooling jacket coupled to one surface of each of the first anode chamber 211 and the first cathode chamber 212 of the first electrolysis unit 210 by welding or the like, and a pipe that connects the cooling jacket to the storage unit 500. Some of the treatment agent, for example, an aqueous sodium hypochlorite solution, stored in the storage unit 500 may pass through the inside of the cooling jacket through the pipe and act as a refrigerant that absorbs heat generated by the reaction in the first electrolysis unit 210. In this case, since circulation equipment for anode products and/or the cathode products and/or a separate heat exchanger provided in the circulation equipment to control heat generation in the conventional electrolysis unit may be omitted, the overall ballast water treatment system may be simplified and miniaturized, and thus maintainability, economic feasibility, efficiency, and the like may be improved.

Figure 6:
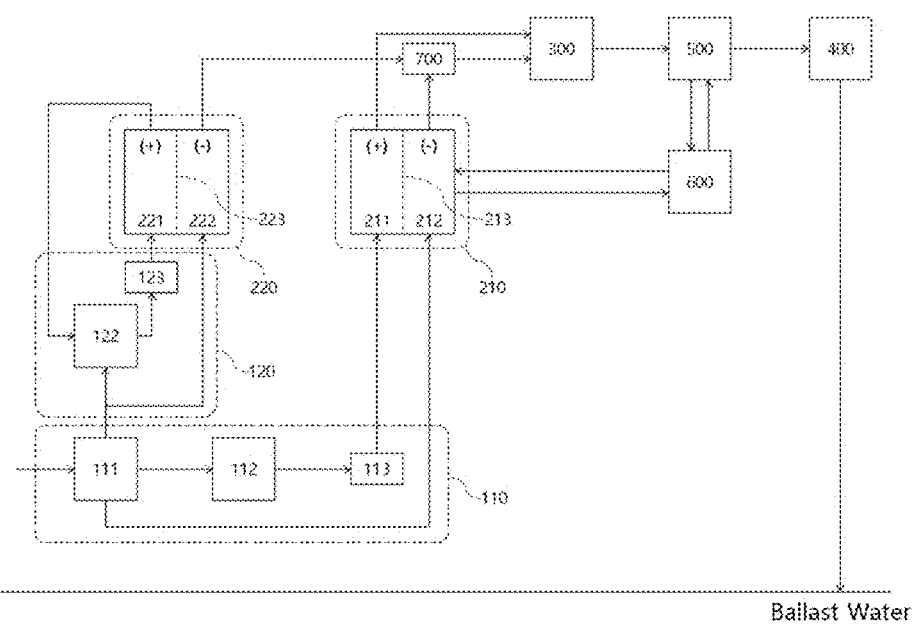

FIG. 6 illustrates a ballast water treatment system according to another embodiment of the present invention.

Referring to FIG. 6, the ballast water treatment system may further include a metal hydroxide generation unit including a second feed unit 120 that includes a second tank 122 in which a metal salt containing two or more moles, of metal ions in a molecule is stored, and a second raw material supply device 123 that mixes the metal salt and a third water stream branching from the first water stream to provide an aqueous metal salt solution, a second electrolysis unit 220 that includes a second anode chamber 221 in which a second anode product is obtained by reacting the aqueous metal salt solution, a second cathode chamber 222 in which a second cathode product is obtained by reacting a fourth water stream branching from at least one of the first to third water streams or provided from the second anode chamber 221 and metal ions provided from the second anode chamber 221, and a second diaphragm 223 that separates the second anode chamber 221 and the second cathode chamber 222, and a connection unit 700 that combines the second cathode product and the first cathode product and provides a result of the combination to the reaction unit 300.

In the second tank 122, a metal salt containing two or more moles of metal ions in a molecule may be stored. The metal salt containing two or more moles of metal ions in the molecule may be dissolved in the third water stream branching from the first water stream provided by the water supply device 111 and may be provided in the form of an aqueous solution to the second anode chamber 221 of the second electrolysis unit 220.

Solid metal salt may be stored in the second tank 122, and the second tank 122 may receive tap water, purified water (pure or higher), and/or seawater from which impurities have been filtered out from the water supply device 111, and generate an aqueous metal salt solution, preferably, a saturated aqueous metal salt solution, in the second raw material supply device 123 to provide the generated aqueous metal salt solution to the second anode chamber 221 of the second electrolysis unit 220.

The second tank 122 may include a metal salt supply unit (not illustrated) through which a solid metal salt is introduced from the outside, an inlet pipe through which the third water stream is provided from the water supply device 111, an inlet pipe through which the second anode product is provided from the second anode chamber 221, a saturated aqueous metal salt solution discharge pipe through which the saturated aqueous solution is discharged, and an exhaust pipe through which gas generated inside the second tank 122 is discharged.

The metal salt may have a structure according to the following Formula.

$$M_xA_y \quad \text{<Formula>}$$

In Formula above, M denotes a monovalent or divalent metal ion, x denotes an integer greater than or equal to 2, A denotes a negative ionic substance that can be combined with the metal ion M, and y denotes an integer that satisfies Formula above.

Examples of the metal ion may include alkaline metal ions such as sodium ions ($Na^+$), potassium ions ($K^+$), and lithium ions ($Li^+$), and/or alkaline earth metal ions such as beryllium ion ($Be^{2+}$), magnesium ions ($Mg^{2+}$), calcium ions ($Ca^{2+}$), strontium ions ($Sr^{2+}$), barium ions ($Ba^{2+}$), and radium ions ($Ra^{2+}$), preferably, alkaline metal ions, and more preferably, sodium ion, but the present invention is not limited thereto. In particular, the metal ion may be the same as the cations provided from the first anode chamber 211 to the first cathode chamber 212 through the first diaphragm 213, that is, of the same type.

The negative ionic substance may be one selected from the group consisting of carbonate ions ($CO_3^{2-}$), sulfate ions ($SO_4^{2-}$), persulfate ions (($S_2O_8)^{2-}$)), phosphate ions ($PO_4^{3-}$), hydrogen phosphate ions ($HPO_4^{2-}$), and a combination of two or more thereof, and preferably, carbonate ions, but the present invention is not limited thereto. Further, the sodium salt produced by combining the sodium ions and the negative ionic substance may be one selected from the group consisting of sodium carbonate ($Na_2CO_3$), sodium bicarbonate ($NaHCO_3$), sodium sulfate ($Na_2SO_4$), sodium persulfate ($Na_2S_2O_8$), tribasic sodium phosphate ($Na_3PO_4$), dibasic sodium phosphate ($Na_2HPO_4$), a combination of two or more thereof, and preferably, sodium carbonate, but the present invention is not limited thereto.

The second electrolysis unit 220 may include the second anode chamber 221 in which a second anode product is obtained by reacting the aqueous metal salt solution, the second cathode chamber 222 in which a second cathode product is obtained by reacting a fourth water stream branching from at least one of the first to third water streams or provided from the second anode chamber 221 and metal ions provided from the second anode chamber 221, and the second diaphragm 223 that separates the second anode chamber 221 and the second cathode chamber 222. When at least a portion of the third water stream, which is a solvent of the aqueous metal salt solution provided in the second anode chamber 221, is provided from the second anode chamber 221 to the second cathode chamber 222 through the second diaphragm 223, the fourth water stream branching from at least one of the first to third water streams may be appropriately omitted.

The second anode chamber 221 may include a anode, and may support anode water containing a substance produced by an electrolysis reaction at the anode and a gaseous substance. Further, the second cathode chamber 222 may include a cathode, and may support cathode water containing a substance produced by an electrolysis reaction at the cathode and a gaseous substance.

For example, in the case in which the metal salt is sodium carbonate ($Na_2CO_3$), when a preset voltage is applied to the second electrolysis unit 220, the following substances may be generated in the second anode chamber 221 and the second cathode chamber 222.

In the second anode chamber 221, an aqueous sodium salt solution may be electrolyzed and sodium ions ($Na^+$), carbon dioxide gas ($CO_2$), and oxygen gas ($O_2$) may be generated, and in the second cathode chamber 222, the fourth water stream may be electrolyzed and hydrogen gas ($H_2$) and hydroxide ions ($OH^-$) may be generated. The sodium ions generated in the second anode chamber 221 may move to the second cathode chamber 222 through the second diaphragm 223, and react with the hydroxide ions pre-generated in the second cathode chamber 222 to generate sodium hydroxide.

When the raw materials provided by the first and second raw material supply devices are salt water and an aqueous sodium carbonate solution, respectively, the sodium hydroxide generated in the second cathode chamber 222 of the second electrolysis unit 220 and the sodium hydroxide generated in the first cathode chamber 212 of the first electrolysis unit 210 may move to the connection unit 700, and be combined with each other and provided as a raw material for producing sodium hypochlorite to the reaction unit 300, and as necessary, may be used as a buffer for adjusting the pH of the sodium hypochlorite generated in the reaction unit 300 and increasing storage stability.

Further, a storage unit (not illustrated) in which the metal hydroxide generated in the second cathode chamber 222, preferably, sodium hydroxide, and more preferably, an aqueous sodium hydroxide solution, is stored may be further included between the second cathode chamber 222 of the second electrolysis unit 220 and the connection unit 700. In this case, the storage unit 500 in which the treatment agent generated in the reaction unit 300 is stored may be referred to as a first storage unit, and the storage unit (not illustrated) in which the aqueous sodium hydroxide solution is stored may be referred to as a second storage unit.

Meanwhile, when operation of the second electrolysis unit 220 is stopped due to inspection, maintenance, etc., or when the ballast water treatment system does not substantially include the second electrolysis unit 220, such as when the second electrolysis unit 220 is temporarily removed from the ballast water treatment system, the metal hydroxide may be directly injected into the reaction unit 300 from the outside of the vessel, or may be injected and stored in second storage unit and then injected into the reaction unit 300 as necessary.

The second tank 122, the pipe through which the aqueous metal salt solution is supplied to the second anode chamber 221, the second anode chamber 221, and the pipe through which the second anode product is supplied to the second tank 122 may constitute a closed loop. As used herein, the term "closed loop" means that any substance is controlled to be introduced from the outside or discharged to the outside, in transfer and circulation of the substances through the second tank 122, the pipe through which the aqueous metal salt solution is supplied to the second anode chamber 221, the second anode chamber 221, and the pipe through which the second anode product is supplied to the second tank 122. As necessary, the closed loop may include an exhaust port for discharging a gas, for example, carbon dioxide gas ($CO_2$) and/or oxygen gas ($O_2$), contained in a substance circulating along the closed loop.

In particular, the pipe through which the aqueous metal salt solution generated in the second tank 122 is supplied to the second anode chamber 221 and the pipe through which the substances generated in the second anode chamber 221 is supplied to the second tank 122 may not include a channel through which any substance can be introduced from the outside or discharged to the outside. However, when the metal salt stored in the second tank 122 is exhausted within a preset range, the required amount of metal salt may be replenished in the second tank 122 so that the aqueous metal salt solution may be continuously supplied to the second anode chamber 221 at the required concentration.

The closed loop may ensure that the metal hydroxide, for example, sodium hydroxide, is continuously and stably generated in the second cathode chamber 222 of the second electrolysis unit 220, the generated metal hydroxide, for example, sodium hydroxide, may be used as a raw material for generating sodium hypochlorite, which is a treatment agent, together with the metal hydroxide, for example, sodium hydroxide, generated in the first cathode chamber 212 of the first electrolysis unit 210 for generating sodium hypochlorite, which is a treatment agent, and as necessary, may be used as a buffer for adjusting the pH of the generated sodium hypochlorite and increasing storage stability.

The ballast water treatment system does not separately inject the metal hydroxide from the outside, which is necessary for controlling the balance of the substances in the first electrolysis unit 210 and the reaction unit 300 and/or the stable storage of the generated treatment agent, and since the metal hydroxide obtained by the metal hydroxide generation unit is used substantially in-situ by including the metal hydroxide generation unit, separate parts (parts required for storage, injection, and the like for the metal hydroxide) for injecting the metal hydroxide from the outside into the reaction unit 300, which has been essentially provided in conventional devices or equipment for producing treatment agents, may be omitted, and accordingly, the burden of transportation, storage, handling, and use of the metal hydroxide may be significantly reduced.

The second diaphragm 223 may be a water-permeable porous membrane, and the type and effect of the water-permeable porous membrane are the same as those described above for the first diaphragm 213.

The second diaphragm 223 may be a cation exchange membrane. The cation exchange membrane may be a soft cation exchange membrane made of a polymer film. The cation exchange membrane may allow the metal ions generated in the second anode chamber 221 to pass through and move into the second cathode chamber 222 by an ion exchange reaction with the functional group provided in the cation exchange membrane, and in some cases, water molecules may form hydrates with the metal ions and may pass through and move into the second cathode chamber 222 through the cation exchange membrane.

However, since the size of the pores provided in the membrane is very small, i.e., nanometers (nm), liquid substances, for example, water, cannot move smoothly from the second anode chamber 221 to the second cathode chamber 222, and the amount of water provided from the second anode chamber 221 to the second cathode chamber 222 due to physical and structural factors may be insufficient to drive the second electrolysis unit to produce the required amount of metal hydroxide.

In this regard, the ballast water treatment system further includes separate parts, such as a pipe and the like for providing the fourth water stream, which is a raw material for hydroxide ions, from the water supply device 111 of the first feed unit 110 to the second cathode chamber 222 to supplement the amount of water provided to the second cathode chamber 222.

Further, the cation exchange membrane may include an additional layer and/or functional group that can prevent the hydroxide ions generated in the second cathode chamber 222 from passing through and moving to the second anode chamber 221.

Figure 7:
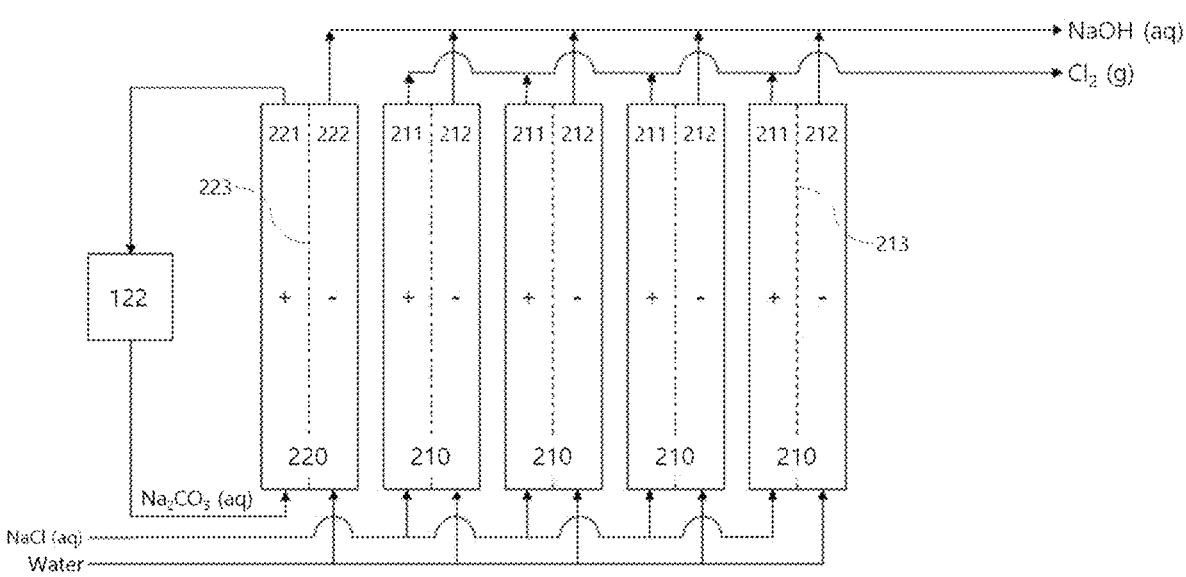
FIG. 7 illustrates first and second electrolysis units according to an embodiment of the present invention.

FIG. 7 illustrates first and second electrolysis units according to an embodiment of the present invention.

Referring to FIG. 7, the first and second electrolysis units 210 and 220 are connected in parallel. As used herein, the term "parallel connection" refers to a state in which substance movement and/or exchange, such as in the case in which the product of the first electrolysis unit 210 is injected into the second electrolysis unit 220 as a raw material, or conversely, in the case in which the product of the second electrolysis unit 220 is injected into the first electrolysis unit 210 as a raw material, does not occur between the first and second electrolysis units 210 and 220, and the first and second electrolysis units 220 are connected so that injection of raw materials and discharge of products are performed independently. However, as necessary, the pipes for injection, discharge, and transfer of the same substances may be integrated into a single pipe.

FIG. 7 illustrates an example of a state in which a single second electrolysis unit 220 and a plurality of first electrolysis units 210 are disposed sequentially and continuously, but the present invention is not limited thereto. In the ballast water treatment system, a plurality of second electrolysis units 220 may be provided, the first and second electrolysis units 210 and 220 may be alternately provided, and/or second electrolysis units 220 may be disposed between a plurality of first electrolysis units 210 disposed continuously.

In the second electrolysis unit 220, a saturated aqueous metal salt solution may circulate in the second anode chamber 221 and the second tank 122, and in the second cathode chamber 222, water provided from the water supply device 111 may be converted into a metal hydroxide and discharged to the outside of the second electrolysis unit 220.

In the first anode chamber 211 of the first electrolysis unit 210, an aqueous raw material solution, for example, saturated salt water, provided from the first tank 112 may be converted into chlorine gas and discharged to the outside of the first electrolysis unit 210, and in the first cathode chamber 212, water provided from the water supply device 111 may be converted into a metal hydroxide, for example, sodium hydroxide and discharged to the outside of the first electrolysis unit 210.

Each of pipes for supplying water to the first and second cathode chambers 212 and 222 and each of pipes for supplying the aqueous raw material solution, for example, saturated salt water, to the first anode chamber 211 may branch from a single pipe. Further, pipes for transferring a metal hydroxide, for example, sodium hydroxide, generated in the first and second cathode chamber 212 and 222 and chlorine gas generated in the plurality of first anode chambers 211 to the reaction unit 300 may be integrated into a single pipe.

At least one of the first and second electrolysis units 210 and 220 may be automatically controlled according to the pH of the treatment agent, for example, an aqueous sodium hypochlorite solution, generated in the reaction unit 300.

For example, when the pH of the aqueous sodium hypochlorite solution obtained in the reaction unit 300 is lower than a preset range, the second electrolysis unit 220 may be further activated to generate an excess amount of sodium hydroxide compared to chlorine gas, and conversely, when the pH of the aqueous sodium hypochlorite solution obtained in the reaction unit 300 is higher than the preset range, a sodium hydroxide production amount may be reduced by delaying the reaction in the second electrolysis unit 220 or lowering reaction efficiency. The amount of sodium hydroxide produced according to the pH of the aqueous sodium hypochlorite solution obtained in the reaction unit 300 may be automatically controlled by sensors, controllers, valves, pumps, etc. that are electrically connected to each other.

The ballast water treatment system may further include a hydrogen gas treatment unit (not illustrated). The hydrogen gas treatment unit may store hydrogen gas that is actually generated or can theoretically be generated in at least one of the first and second cathode chambers 212 and 222 and use the hydrogen gas as a raw material for driving a fuel cell, or may convert the hydrogen gas into water by bringing it into contact with a hydrogen oxidation catalyst, then circulate the hydrogen gas to the water supply device 111 or dilute the hydrogen gas appropriately, and discharge the hydrogen gas to the outside. The hydrogen gas treatment unit may be provided inside and/or around at least one of the first and second cathode chambers 212 and 222. The hydrogen gas treatment unit may include, for example, a leak detector, a discharge barrier, a catalytic reactor and/or neutralizer for detoxifying leaked hydrogen gas, a device for preventing diffusion through absorption and/or adsorption, etc., but the present invention is not limited thereto.

The above description of the present invention is only exemplary, and it will be understood by those skilled in the art that various modifications can be made without departing from the technical scope of the present invention and without changing essential features. Therefore, the above-described embodiments should be considered in a descriptive sense only and not for purposes of limitation. For example, each component described as a single type may be implemented in a distributed manner, and similarly, components that are described as being distributed may be implemented in a combined form.

The scope of the present invention is defined not by the detailed description but by the appended claims, and encompasses all modifications or alterations derived from meanings, the scope, and equivalents of the appended claims.

REFERENCE NUMERALS

110: first feed unit
111: water supply device
112: first tank
113: first raw material supply device
120: second feed unit
122: second tank
123: second raw material supply device
210: first electrolysis unit
211: first anode chamber
211': anode plate
212: first cathode chamber
212': cathode plate
213: first diaphragm
220: second electrolysis unit
221: second anode chamber
222: second cathode chamber
223: second diaphragm
300: reaction unit
400: injection unit
500: storage unit
600: heat exchange unit
700: connection unit

The invention claimed is:

1. A ballast water treatment system, which is installed inside a vessel, the treatment system comprising:

a first feed unit that includes a first tank in which a solid raw material is stored, a water supply device that supplies a first water stream to the first tank, and a first raw material supply device that mixes the solid raw material and the first water stream to generate an aqueous raw material solution;

a first electrolysis unit that includes a first anode chamber in which a first anode product is obtained by reacting the aqueous raw material solution, a first cathode chamber in which a first cathode product is obtained by reacting water and cations provided from the first anode chamber, and a first diaphragm that separates the first anode chamber and the first cathode chamber;

a reaction unit in which a treatment agent is obtained by reacting the first anode product and the first cathode product; and an injection unit that provides the treatment agent to ballast water, wherein the reaction unit is integrated with the first electrolysis unit, wherein a portion of the inside of the first electrolysis unit is provided as a space in which the first anode product and the first cathode product are collected, and wherein the first anode product and the first cathode product react in the space to generate the treatment agent.

2. The ballast water treatment system of claim 1, wherein, in the first cathode chamber, the water is at least a portion of the first water stream, which is a solvent of the aqueous raw material solution provided in the first anode chamber, provided from the first anode chamber to the first cathode chamber through the first diaphragm.

3. The ballast water treatment system of claim 2, wherein the first diaphragm is a water-permeable porous membrane.

4. The ballast water treatment system of claim 3, wherein the first anode chamber includes two or more anode plates protruding at preset intervals, the first cathode chamber includes two or more cathode plates protruding at preset intervals in spaces between the anode plates, and the first diaphragm is located in a space between the anode plate and the cathode plate.

5. The ballast water treatment system of claim 1, wherein, in the first cathode chamber, the water is at least a portion of a second water stream branching from the first water stream.

6. The ballast water treatment system of claim 5, wherein the first diaphragm is a cation exchange membrane.

7. The ballast water treatment system of claim 1, further comprising a storage unit which is disposed between the reaction unit and the injection unit and in which the treatment agent is stored.

8. The ballast water treatment system of claim 7, further comprising a heat exchange unit that cools the first electrolysis unit using the treatment agent stored in the storage unit.

9. The ballast water treatment system of claim 1, wherein a concentration of the treatment agent obtained in the reaction unit ranges from 0.01 to 50 wt %.

10. The ballast water treatment system of claim 1, wherein the first feed unit further includes an aqueous raw material solution treatment device that removes impurities contained in the aqueous raw material solution.

11. The ballast water treatment system of claim 1, further comprising a metal hydroxide generation unit including:

a second feed unit that includes a second tank in which a metal salt containing two or more moles of metal ions per mole of the metal salt is stored, and a second raw material supply device that mixes the metal salt and a third water stream branching from the first water stream to provide an aqueous metal salt solution;

a second electrolysis unit that includes a second anode chamber in which a second anode product is obtained by reacting the aqueous metal salt solution, a second cathode chamber in which a second cathode product is obtained by reacting a fourth water stream branching from at least one of the first to third water streams or provided from the second anode chamber, and metal ions provided from the second anode chamber, and a second diaphragm that separates the second anode chamber and the second cathode chamber; and a connection unit that combines the second cathode product and the first cathode product and provides a result of the combination to the reaction unit.

12. The ballast water treatment system of claim 11, wherein the second tank, a pipe through which the aqueous metal salt solution is supplied to the second anode chamber, the second anode chamber, and a pipe through which the second anode product is supplied to the second tank constitutes a closed loop.

13. The ballast water treatment system of claim 12, wherein the closed loop includes an exhaust port for discharging a gas contained in a substance circulating along the closed loop.

14. The ballast water treatment system of claim 11, wherein the metal salt has a structure according to the following Formula:

$$M_xA_y \qquad \qquad \text{<Formula>}$$

in Formula above, M denotes a monovalent or divalent metal ion, x denotes an integer greater than or equal to 2, A denotes a negative ionic substance that can be combined with the metal ion M, and y denotes an integer that satisfies the above Formula.

15. The ballast water treatment system of claim 11, wherein the second diaphragm is a water-permeable porous membrane.

16. The ballast water treatment system of claim 11, wherein the second diaphragm is a cation exchange membrane.

17. The ballast water treatment system of claim 11, wherein the first and second electrolysis units are connected in parallel.

18. The ballast water treatment system of claim 1, further comprising a hydrogen gas treatment unit.

* * * * *